(12) United States Patent
Burlot

(10) Patent No.: US 8,117,939 B2
(45) Date of Patent: Feb. 21, 2012

(54) LINE GUIDE DEVICE AND INDUSTRIAL ROBOT EQUIPPED WITH SUCH A DEVICE

(75) Inventor: Claude Burlot, Bullion (FR)

(73) Assignee: Leoni Kabel Holding GmbH & Co. KG, Nuremberg (DE)

( * ) Notice: Subject to any disclaimer, the term of this patent is extended or adjusted under 35 U.S.C. 154(b) by 1152 days.

(21) Appl. No.: 11/815,256

(22) PCT Filed: Jan. 31, 2006

(86) PCT No.: PCT/EP2006/000792
§ 371 (c)(1),
(2), (4) Date: Oct. 26, 2007

(87) PCT Pub. No.: WO2006/082013
PCT Pub. Date: Aug. 10, 2006

(65) Prior Publication Data
US 2008/0164382 A1    Jul. 10, 2008

(30) Foreign Application Priority Data
Feb. 1, 2005  (DE) .......................... 10 2005 004 813

(51) Int. Cl.
| B25J 17/00 | (2006.01) |
| B25J 17/02 | (2006.01) |
| B25J 18/00 | (2006.01) |
| B60T 7/10 | (2006.01) |
| B64C 13/30 | (2006.01) |
| F16C 1/22 | (2006.01) |

(52) U.S. Cl. ................................ 74/490.02; 74/501.5 R
(58) Field of Classification Search ............... 74/490.02, 74/501.5 R, 502.4, 502.5, 502.6; 254/389; 248/49
See application file for complete search history.

(56) References Cited

U.S. PATENT DOCUMENTS

| 6,230,859 | B1 | 5/2001 | Springmann | |
| 6,431,018 | B1* | 8/2002 | Okada et al. | 74/490.02 |
| 6,811,124 | B2* | 11/2004 | Karlinger | 248/49 |
| 7,810,765 | B2* | 10/2010 | Burlot | 248/75 |
| 2004/0144764 | A1* | 7/2004 | Inoue et al. | 219/137.9 |
| 2005/0199601 | A1* | 9/2005 | Inoue et al. | 219/125.1 |
| 2006/0000817 | A1* | 1/2006 | Inoue et al. | 219/125.1 |
| 2007/0158504 | A1* | 7/2007 | Burlot | 248/52 |

FOREIGN PATENT DOCUMENTS

| DE | 8519446.8 U1 | 10/1985 |
| DE | 29720048 U1 | 3/1999 |
| DE | 20113742 U1 | 11/2001 |
| JP | 200267828 A | 3/2002 |

* cited by examiner

Primary Examiner — Justin Krause
(74) Attorney, Agent, or Firm — Laurence A. Greenberg; Werner H. Stemer; Ralph E. Locher

(57) ABSTRACT

In order to enable a compensating movement of a supply line (38) in an industrial robot (32), a line guide device is provided that, in particular, has a telescopic fork design. A slideway element (4) is provided, which is fastened to a rear robot arm (30) and through which a slide rod (6) is displaceably guided. A first clip (24) is placed on the front end of the slide rod (6), and the supply line (38) is fastened in a clamped manner inside this clip.

17 Claims, 4 Drawing Sheets

LINE GUIDE DEVICE AND INDUSTRIAL ROBOT EQUIPPED WITH SUCH A DEVICE

BACKGROUND OF THE INVENTION

Field of the Invention

The invention relates to a line guide device for guiding a supply line, in particular for guiding a hose assembly of an industrial robot. Furthermore, the invention relates to an industrial robot equipped with such a line guide device.

In the multiple-axis industrial robots which are customarily used nowadays, a plurality of individual lines for supplying a tool, for example a welding tool, which is arranged on the robot hand are fed via a hose assembly to the front most robot arm which is also called a robot hand. The individual lines are, for example, electrical supply cables, electrical control cables, data cables and medium guides for gases or fluids. These individual lines are combined in what is known as the hose assembly and are surrounded by a tubular protective cover. A hose assembly of this type is subjected to high loads, firstly on account of the relative movements of the robot arms with respect to one another and, in particular, also on account of the often adverse surrounding conditions (high temperatures, aggressive media, such as welding spatter, etc.).

In order to make reliable guiding of the hose assembly possible, a line guide device is usually used which is provided in such a way that a compensation movement of the hose assembly is made possible in the case of a relative movement between two robot arms. A line guide device in an industrial robot is to be gathered, for example, from DE 201 13 742 U1.

SUMMARY OF THE INVENTION

The invention is based on the object of specifying a line guide device of structurally simple construction which operates reliably and makes a compensation movement possible for a supply line between two machine parts which can move relative to one another, in particular for a hose assembly of an industrial robot.

According to the invention, the object is achieved by a line guide device having the features of patent claim 1. In accordance with the latter, the line guide device has a front fastening element which can be displaced in its longitudinal direction and is provided for the arrangement of a first clamping clip, and which comprises a first clamping clip. The supply line is clamped firmly in this clamping clip, with the result that it is fixed in the longitudinal direction. Furthermore, the line guide device has a sliding guide element which is provided for fastening to a machine part, for example a robot arm. A sliding rod is mounted in the sliding guide element such that it can slide in the longitudinal direction counter to the restoring force of a restoring element. At the same time, the sliding rod is fastened to the front fastening element.

As a result of this construction, the front fastening element is therefore mounted such that it can be displaced longitudinally with respect to the stationary sliding guide element. By way of the front fastening element, the clamping clip and the supply line are also displaceable in the longitudinal direction relative to the stationary sliding guide element. If the hose assembly then has to be tracked in the case of a robot movement, the hose assembly is pulled forward on account of the pulling force which is exerted by the robot hand, with the result that the fastening element is pulled to the front counter to the restoring force of the restoring element. As soon as the pulling force diminishes, the fastening element is moved into a rear position again, with the result that the hose assembly is always stressed in the region toward the robot hand in accordance with the stressing force of the restoring element and does not form any loops. Overall, this line guide device is therefore configured in the manner of a telescopic rod or telescopic fork, the hose assembly being guided outside the telescopic elements.

Here, sliding rod is understood in general to be a sliding element which extends in the axial direction and is preferably configured to be circular and, in particular, hollow on the inside and therefore tubular. As a result of the refinement with the sliding rod which is guided in a sliding manner through the sliding guide device and the fastening of the supply line in the clamping clip which is fixed to the front fastening element, reliable operation is ensured with a simple and at the same time robust construction.

The line guide device is suitable in general for making a compensation movement of a supply line possible, which supply line connects two machine parts to one another, in particular robot arms, which can move relative to one another.

The restoring element is expediently supported on one side on the sliding guide element and on the other side on a rear stop which is fastened to the sliding rod. This makes a compact construction possible, as no further complicated construction is required for the restoring element. Rather, the sliding rod extends from the front fastening element through the sliding guide element and the restoring element acts in the rear region on one side on an action point which is connected fixedly to the sliding rod and on the other side on the sliding guide element.

Here, the restoring element is preferably a helical spring, through which the sliding rod is guided. This also ensures a compact and robust construction.

According to one expedient development, the sliding rod is guided through a through opening of the sliding guide element, a tubular sliding element being inserted in the through opening, through which tubular sliding element the sliding rod is guided substantially without play. Reliable guiding is ensured by the playfree or virtually playfree guidance in the sliding element. Secondly, sliding with as low friction as possible is made possible by the sliding element itself. For this purpose, the sliding element is composed of a suitable material having a low coefficient of friction. In particular, the sliding element is composed of plastic, whereas the sliding guide element is preferably made from metal.

In order to avoid, or at least to reduce the effect of, the front fastening element striking the sliding guide element during the restoring movement, a shock absorber is provided between the sliding guide element and the fastening element. Said shock absorber is fastened, in particular, on the end side to one of the two parts, preferably to the sliding guide element.

In one expedient refinement, the sliding rod is fastened exchangeably in the fastening element. Overall, the sliding rod can therefore be exchanged without problems. As a result, the line guide device is of modular construction and can be adapted without problems to different use purposes, for example different robot sizes, etc. In order to make compensation movements of different lengths possible, sliding rods of different lengths, for example, are used. In parallel with this, different restoring forces can be set via the selection of suitable restoring elements. The line guide device is therefore implemented in the manner of a kit system, in order for it to be possible to adapt it without problems to different requirements.

In one expedient development, a second restoring element, in particular a second helical spring, is provided in the region between the sliding guide element and the fastening element. Said second restoring element serves firstly to define the rear position of the fastening element fixedly. At the same time, the second helical spring avoids the front fastening element striking the sliding guide element. The restoring movement is also not braked abruptly, but in a sprung manner.

As the supply line is held in the line guide device only in the first clamping clip on the front fastening element and is otherwise not guided further, there is provision according to one expedient development for a cover to be arranged in the rear region behind the fastening element. This cover prevents contact of the supply line with the movable elements of the line guide device, for example with the sliding rod and the spring. Interlocking or clamping is therefore not possible. Here, this cover is preferably fastened to the sliding guide element. The cover is, for example, merely a plate-shaped cover. As an alternative, it can also be configured as a box which encloses the line guide device at least partially and in which the sliding guide element and the rear part region of the sliding rod with the helical spring are arranged. Here, the box has sufficient free space for the sliding movement of the sliding rod. In principle, there is also the possibility that the sliding guide element itself is configured overall in a sleeve-like manner or in the manner of a box, on the end side of which the sliding rod is inserted. In this variant, the restoring element is preferably arranged within the sleeve-like sliding guide element and acts, for example, on one side on a rear wall of the sleeve and on the other side on an end-side end of the sliding rod.

In order also to make guiding possible which is as satisfactory and reliable as possible in the case of high forces, two sliding rods which are arranged parallel to one another are provided according to one expedient development. Overall, the line guide device is therefore of redundant configuration, the two sliding rods being configured and guided symmetrically with respect to one another.

In order to achieve as high a stability as possible, the two sliding rods are guided jointly in the sliding guide element, each sliding rod being assigned a dedicated through opening. The sliding guide element is therefore an integrated, in particular metallic block, through which the two sliding rods are guided in a manner which is spaced apart from one another. There is preferably provision here for the sliding guide device to have a fastening flange with bore holes, through which fastening elements, in particular screws, can be guided for fastening to a robot arm.

Furthermore, the fastening element is expediently likewise provided jointly for both sliding rods. The sliding rods are fastened in said fastening element, in particular in a clamped manner. Here, they are preferably inserted at one end side of the fastening element. An upper flat side of the fastening element which adjoins the end side is expediently used for the arrangement of the first clamping clip. For this purpose, the upper flat side has threaded holes, with the result that the first clamping clip can be screwed on without problems.

Here, the fastening element and/or the first clamping clip are/is preferably configured in such a way that the clamping clip can be rotated relative to the fastening element or can at least be fixed in different rotational positions. In the case of the clamping clip which can rotate during operation, in particular, a rotational compensation movement is made possible for the supply line.

Furthermore, the object is achieved according to the invention by an industrial robot as claimed in claim 12. The advantages which are described with regard to the line guide device and preferred refinements are also to be transferred to the industrial robot in an analogous manner.

Here, the line guide device is fastened to the sliding guide device on a rear machine part, that is to say a rear robot arm. For this purpose, the sliding guide device is flange-connected to the rear robot arm with the aid of the abovementioned flange.

The hose assembly is usually held in a second clamping clip on the front machine part, in particular on the front robot arm or the robot hand. According to one expedient development, no further fastening or guide elements are provided between the first clamping clip of the line guide device and the second clamping clip on the robot hand. Rather, the supply line can move freely in the region between these two clamping clips, with the result that it can follow the movements of the robot hand satisfactorily.

Furthermore, the length of the supply line between the two clamping clips is fixed by the nondisplaceable, clamped fastening of the supply line in the first clamping clip on one side and in the second clamping clip on the other side. The supply line itself therefore does not slide through any guide elements. To this extent, the supply line is not exposed to any frictional influences and there is also not the risk of the supply line becoming tilted or being loaded in a pronounced manner within guide elements.

No further guide or holding element is also expediently provided in the rear region after the first clamping clip, through which further guide or holding element the supply line would have to be guided in a sliding manner. Rather, following the line guide device, the supply line is guided in an arc to a connecting adapter which is fastened to a robot arm, in order to make the compensation movement possible. The hose assembly ends at the connecting adapter. The connecting adapter serves as separating or connecting point for the individual lines.

Exemplary embodiments of the invention will be explained in the following text using the figures, in which, in each case in diagrammatic and partially greatly simplified illustrations:

DESCRIPTION OF THE INVENTION

In the figures, identical or identically functioning parts are provided with the same designations.

Figure 1:
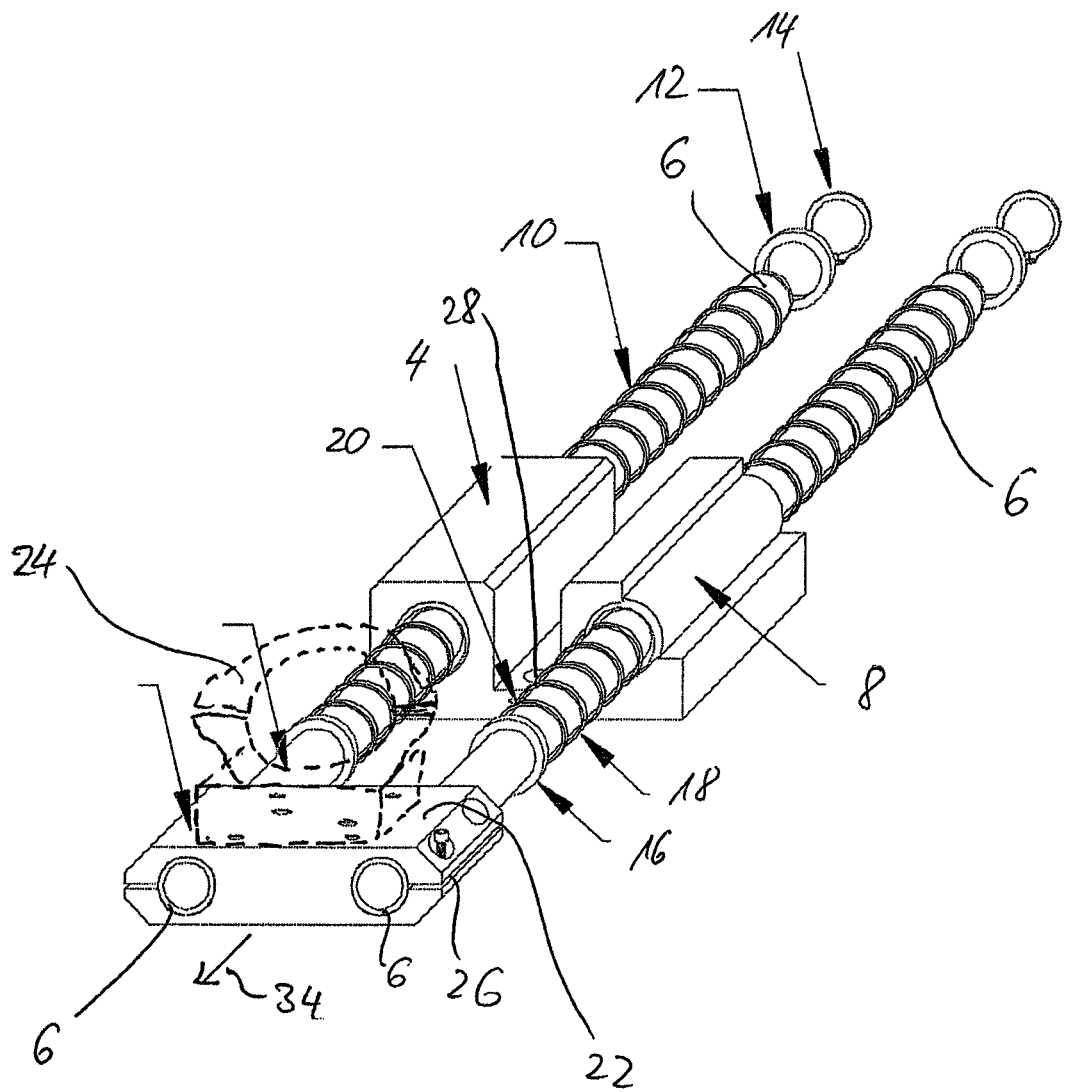
FIG. 1 shows a first design variant of a line guide device, in a perspective illustration.
Figure 2:
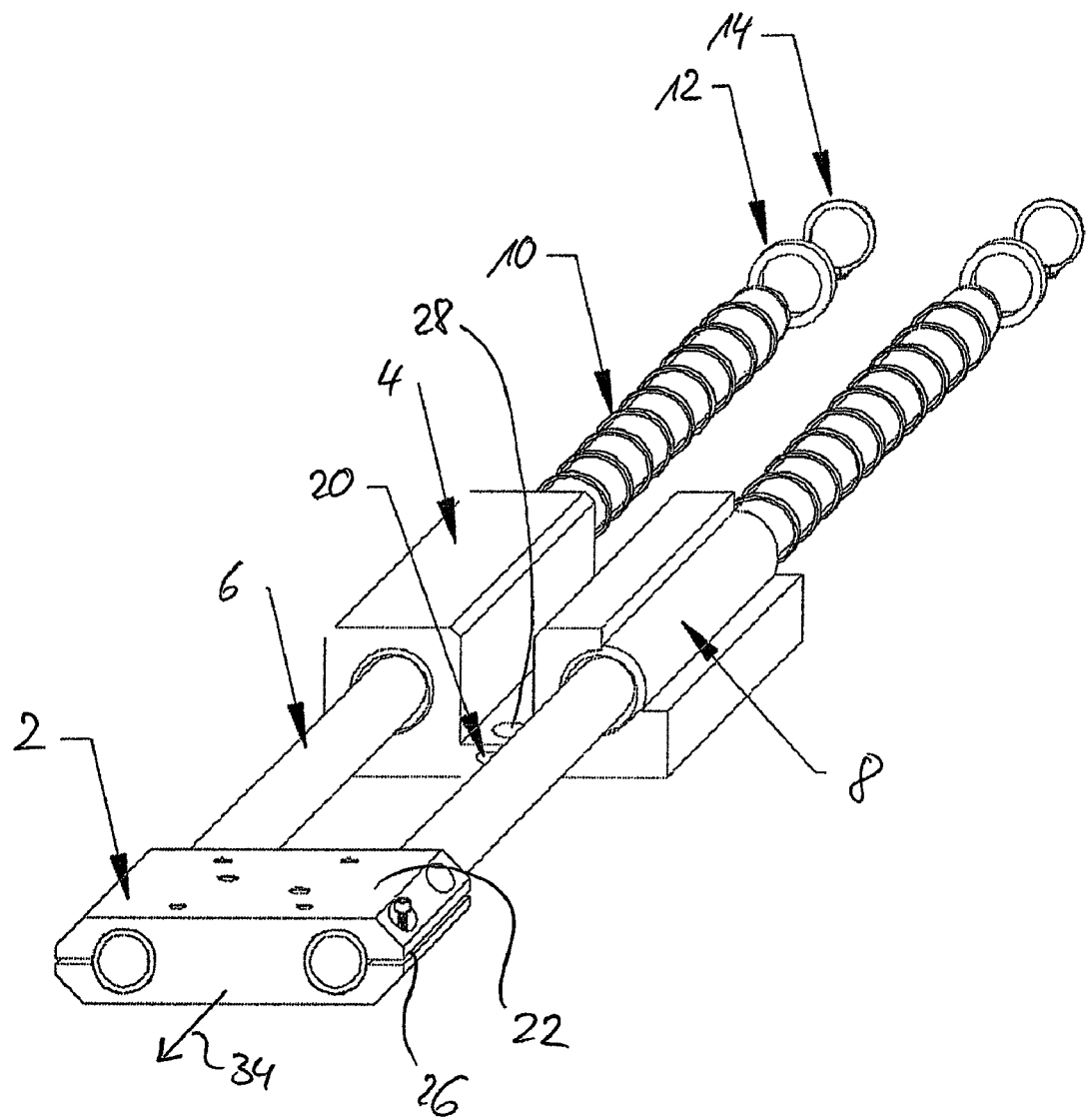
FIG. 2 shows a second design variant of the line guide device, in a perspective illustration.
Figure 3:
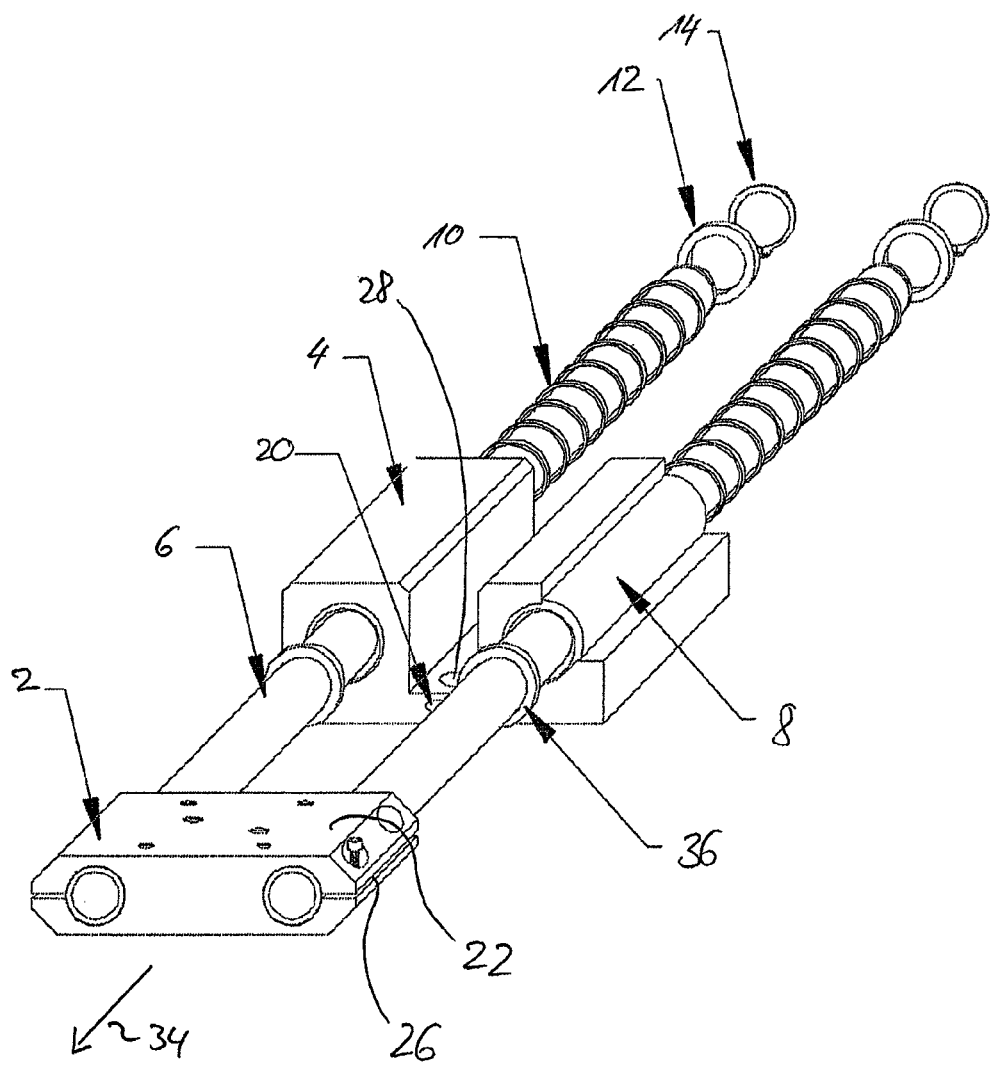
FIG. 3 shows a third design variant of the line guide device, in a perspective illustration.

As can be gathered from FIGS. 1 to 3, a line guide device comprises a front fastening element 2, a sliding guide element 4, two tubular sliding rods 6, two sliding sleeves 8, two rear helical springs 10, two rear stop rings 12, two rear clamping rings 14 for fixing the stop rings 12, two front stop rings 16 and two front helical springs 18. A shock absorber element 20 is arranged on one end side of the sliding guide element 4. The front helical springs 18 likewise act in the manner of a shock absorber.

The sliding rods 6 are configured in each case as tubes and are inserted on the end side into the fastening element 2 of plate-like configuration. The fastening element 2 has a plurality of threaded holes on an upper flat side 22, which threaded holes serve to fasten a first clamping clip 24, in particular also in different rotational positions. The first clamping clip 24 is depicted in FIG. 1 by dashed lines. The sliding rods 6 are fastened in a clamped manner by way of their front ends in tubular through openings of the fastening element 2. For this purpose, the fastening element 2 is of slotted configuration on its edge sides. The slot 26 extends radially as far as the through opening for the sliding rod 6 and can be constricted by means of screws, with the result that the sliding rods 6 are clamped.

The sliding guide element 4 is of integral configuration overall and has a base-side fastening flange having a plurality of bore holes 28. The fastening flange serves for fastening to a robot arm 30 of an industrial robot 32 (cf. FIGS. 4, 5).

The sliding guide element 4 has through holes for each sliding rod 6, into which through holes the sliding sleeve 8 is pushed. In turn, the sliding rod 6 is guided through the sliding sleeve 8 in each case. In the rear region, the rear helical spring 10 is pushed over the respective sliding rod 6. The helical springs 10 are supported with one end in each case on the sliding guide element 4. They are supported by way of their rear end on the rear stop ring 12 which is secured in a stationary position by way of the clamping ring 14. In the figures, the rings 12, 14 are shown in the manner of an exploded illustration.

The front helical springs 18 are likewise supported by way of their one end on the sliding guide element 4 and by way of their other end on the front stop ring 16. The prestress of the helical springs 10, 18 can be set via the positioning of the stop rings 12, 16.

In order to mount the entire line guide device, the sliding rods 6 are pushed through the respective sliding sleeve 8. Subsequently or prior to this, the rear helical springs 10 and optionally the front helical springs 18 are pushed over the sliding rods 6. The ends of the sliding rods 6 are clamped on one side jointly in the fastening element 2 and are provided with the rear connecting and clamping rings 12, 14.

In the design variant according to FIG. 1, the front helical springs 18 and the front stop rings 16 are also mounted in the front region before the fastening of the fastening element 2.

The sliding rods 6 are guided in a sliding manner in the sliding sleeve 8 apart from a necessary play for guidance with as low friction as possible. If the fastening element 2 is deflected in the longitudinal or arrow direction 34, the rear helical spring 10 is compressed. As soon as the exerted pulling force in the longitudinal direction 34 diminishes, the fastening element 2 is moved again into a rear, withdrawn position. The fastening element 2 is therefore freely movable in the longitudinal direction 34 in comparison with the stationary sliding guide element 4.

During the rear movement, the fastening element 2 in the exemplary embodiment of FIG. 1 strikes the front stop ring 16 and the front helical spring 18 is compressed, with the result that the restoring movement is cushioned and the fastening element 2 does not strike the sliding guide element 4.

In the design variant according to FIG. 2, in contrast to the design variant according to FIG. 1, the front helical springs and the front stop rings 16 are omitted. In this case, the fastening element 2 can be withdrawn as far as the sliding guide element 4, with the result that these two elements move against one another with their two end sides. In order to avoid a heavy impact, the shock absorber element 20 is provided which cushions the stop of the fastening element 2.

In the exemplary embodiment of FIG. 3, in contrast to that of FIG. 2, an annular stop element 36 is provided on each sliding rod 6 in the front region. These stop elements 36 limit the restoring movement. Both the stop elements 36 and the front stop rings 16 are to be fastened to the sliding rod 6 at different axial positions, for example by way of clamping rings (not shown in greater detail here). The prestress of the helical springs 10, 18 can be set by the selection of the axial position of the rear stop rings 12 and/or the front stop rings 16.

Figure 4:
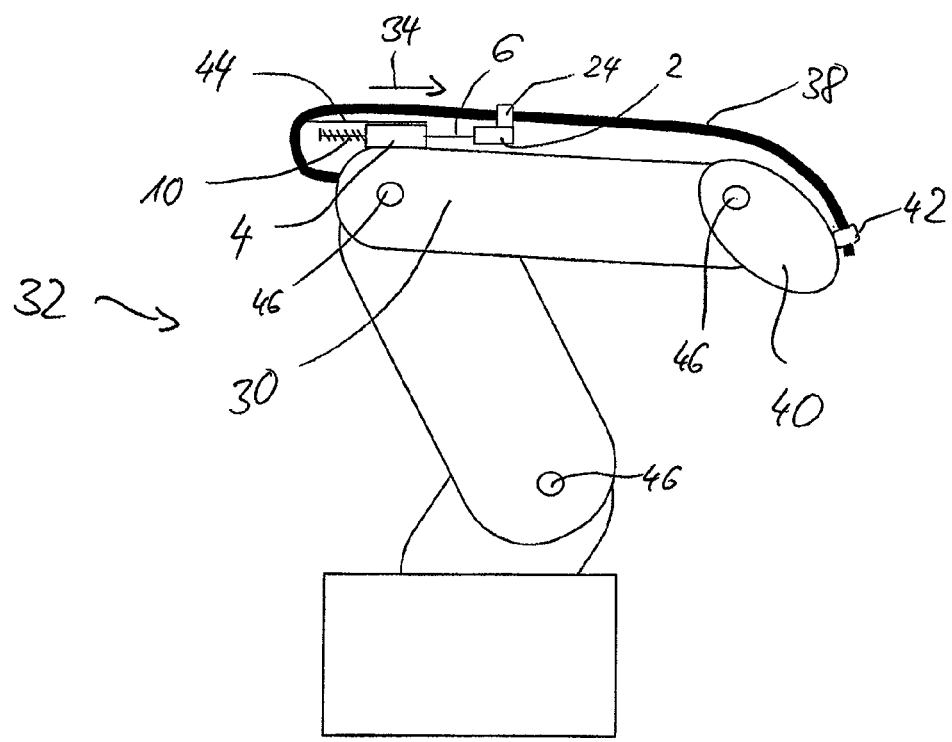
FIGS. 4 and 5 show a greatly simplified diagrammatic illustration of an industrial robot having the line guide device.
Figure 5:
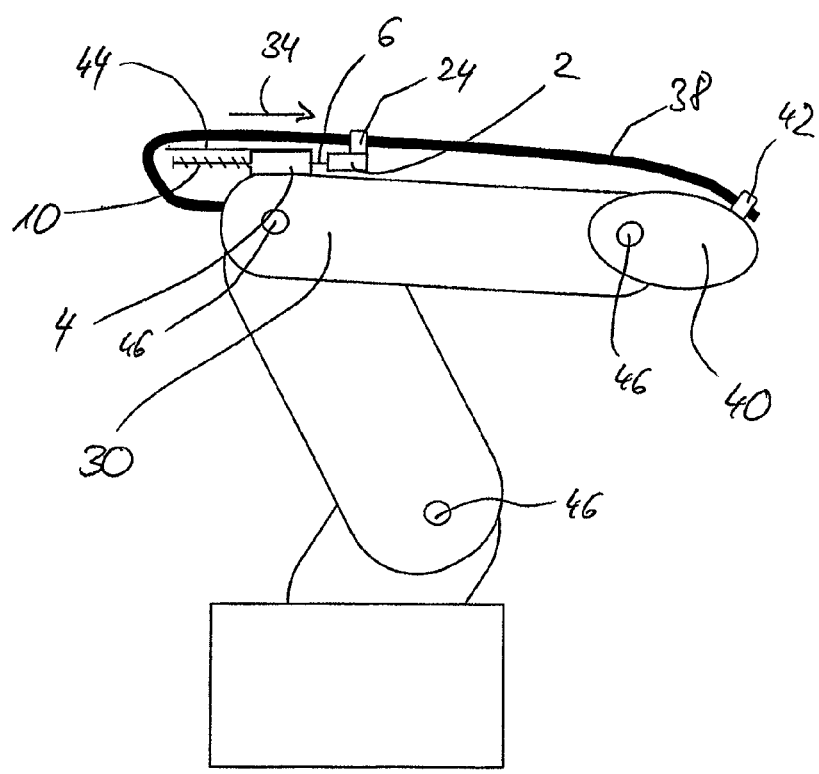

The method of operation of the line guide device will be explained in greater detail in the following text using FIGS. 4 and 5. The latter show a multiple-axis industrial robot 32 which has a plurality of robot arms 30, 40 which can be rotated with respect to one another about what are known as robot axes 46. In particular, this is a six-axis industrial robot 32 which has six degrees of rotational or movement freedom. FIGS. 4 and 5 show only some of the degrees of movement freedom.

The line guide device is fastened with the sliding guide element 4 to one of the robot arms which will also be denoted rear robot arm 30 in the following text. A supply line 38 which is denoted as hose assembly is guided from a separating point which is not shown in greater detail here and is configured as an adapter plate on one of the rear robot arms via the line guide device to a robot hand 40 or to a front robot arm. In the case of a six-axis industrial robot, the rear robot arm 30 corresponds to what is known as a J3 plane and the robot hand 40 corresponds to what is known as a J6 plane.

In addition to the separating point, the supply line 38 is held only in the first clamping clip 24 of the line guide device and in a second clamping clip 42 on the robot hand 40. The supply line 38 is in each case fastened by clamping in the clamping clips 24, 42, with the result that it does not slide through the clamping clips 24, 42. As a result, the length of the supply line 38 between the clamping clips 24, 42 is fixed.

In the case of a relative movement of the robot hand 42 with respect to the rear robot arm 30, for example from the situation which is shown in FIG. 5 to the situation which is shown in FIG. 4, a pulling force is exerted on the supply line 38. On account of the fixed fastening of the supply line 38 on the first clamping clip 24, the fastening element 2 is pulled forward in the longitudinal direction 34 counter to the restoring force of the rear helical spring 10. As soon as the pulling force diminishes and the robot hand 40 returns again into the position which is shown in FIG. 5, the supply line 38 is restored again into a rear position via the fastening element 2.

In the rear region, the supply line 38 is guided in an arc to the separating point which is not shown here in greater detail. This arc makes a compensation movement possible.

In order to avoid undesired contact with the individual components of the line guide device, a cover 44 is provided which, in the exemplary embodiment, is attached as a plate-shaped element on the sliding guide element 4.

A secure and reliable compensation movement with low loading of the supply line 38 is achieved by the line guide device which is described here, is configured in the manner of a telescopic fork and in which the supply line 38 is guided along outside the line guide device and is in contact with the line guide device only via the first clamping clip 24. At the same time, the line guide device has a comparatively simple, compact and therefore very robust construction.

LIST OF DESIGNATIONS

2 Fastening element
4 Sliding guide element
6 Sliding rod
8 Sliding sleeve
10 Rear helical spring
12 Rear stop ring
14 Clamping ring
16 Front stop ring 18 Front helical spring
20 Shock absorber element
22 Upper flat side
24 First clamping clip
26 Slot
28 Bore holes
30 Rear robot arm
32 Industrial robot
34 Longitudinal direction
36 Stop element
38 Supply line
40 Rotor hand
42 Second clamping clip
44 Cover
46 Robot axis

The invention claimed is:

1. A line guide device for guiding a supply line and for enabling a compensation movement of the supply line in a longitudinal direction, the line guide device comprising:
a fastening element displaceably mounted in the longitudinal direction and carrying a first clamping clip for clamp-fastening the supply line;
a rigid sliding rod fastened to said fastening element;
a stationary sliding guide element slidingly supporting said rigid sliding rod for sliding in the longitudinal direction counter to a restoring force of a restoring element; and
a further restoring element disposed between said stationary sliding guide element and said fastening element.

2. The line guide device according to claim 1 configured for guiding a hose assembly of an industrial robot.

3. The line guide device according to claim 1, wherein said restoring element is supported between said stationary sliding guide element and a stop fastened on said sliding rod.

4. The line guide device according to claim 1, wherein said restoring element is a helical spring and said sliding rod is guided through said helical spring.

5. The line guide device according to claim 1, wherein said stationary sliding guide element is formed with a through opening and said sliding rod is guided through a sliding sleeve inserted in said through opening.

6. The line guide device according to claim 1, which comprises a shock absorber element disposed to act between said stationary sliding guide element and said fastening element.

7. The line guide device according to claim 1, wherein said sliding rod is exchangeably fastened in said fastening element.

8. The line guide device according to claim 1, wherein said further restoring element is a helical spring.

9. The line guide device according to claim 1, which further comprises a cover disposed in a region behind said fastening element and mounted such that the supply line extends above said cover in a mounted state thereof.

10. A line guide device for guiding a supply line and for enabling a compensation movement of the supply line in a longitudinal direction, the line guide device comprising:
a fastening element displaceably mounted in the longitudinal direction and carrying a first clamping clip for clamp-fastening the supply line;
a rigid sliding rod fastened to said fastening element, said sliding rod being one of two mutually parallel sliding rods;
a stationary sliding guide element slidingly supporting said rigid sliding rods for sliding in the longitudinal direction counter to a restoring force of a restoring element.

11. The line guide device according to claim 10, wherein said two sliding rods are guided jointly in said stationary sliding guide element, each in a respective, dedicated through opening.

12. The line guide device according to claim 10, wherein said two sliding rods are commonly guided on an end side into said fastening element, and said fastening element has an upper flat side adjoining the end side and configured for fastening said first clamping clip.

13. An industrial robot, comprising a supply line guided over at least one robot axis and a line guide device according to claim 1, said line guide device having said fastening element displaceably mounted in the longitudinal direction and said first clamping clip fixedly holding said supply line; said line guide device further having said stationary sliding guide element fastened to a robot arm and a sliding rod that is fastened to said fastening element is slidably mounted in the longitudinal direction counter to the restoring force of the restoring element.

14. The industrial robot according to claim 13, which comprises a second clamping clip disposed on a front robot arm, and wherein a length of said supply line between said first and second clamping clips is constant, irrespective of a movement thereof.

15. The industrial robot according to claim 14, wherein no further guide or holding elements are disposed between said first and second clamping clips.

16. The industrial robot according to claim 13, wherein said supply line extends outside said line guide device in a region behind said first clamping clip.

17. The industrial robot according to claim 13, wherein said first clamping clip is rotatably fastened to said fastening element.

* * * * *